US008205744B1

(12) United States Patent
Tashjian (10) Patent No.: US 8,205,744 B1
(45) Date of Patent: *Jun. 26, 2012

(54) LAPTOP SHIELD CARRYING CASE AND CELLULAR SHIELD HOLSTER

(76) Inventor: Richard Tashjian, Oradell, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/883,697

(22) Filed: Sep. 16, 2010

Related U.S. Application Data (63) Continuation-in-part of application No. 12/211,589, filed on Sep. 16, 2008, now Pat. No. 7,772,504.

(51) Int. Cl.
*B65D 85/00* (2006.01)
*H05K 9/00* (2006.01)
(52) U.S. Cl. ............... 206/320; 174/380; 174/382
(58) Field of Classification Search .......... 206/320, 206/576; 174/380, 382, 390, 391
See application file for complete search history.

(56) References Cited

U.S. PATENT DOCUMENTS

| | | | | |
|---|---|---|---|---|
| 5,045,637 A * | 9/1991 | Sato et al. | | 174/391 |
| 5,124,899 A * | 6/1992 | Hale | | 362/253 |
| 5,367,309 A * | 11/1994 | Tashjian | | 343/702 |
| 5,379,893 A * | 1/1995 | Ruiz | | 206/320 |
| 5,400,903 A * | 3/1995 | Cooley | | 206/320 |
| 6,109,434 A * | 8/2000 | Howard, Jr. | | 206/320 |
| 6,149,001 A * | 11/2000 | Akins | | 206/320 |
| 6,223,896 B1 * | 5/2001 | Bell et al. | | 206/320 |
| 6,349,825 B1 * | 2/2002 | Swinger et al. | | 206/320 |
| 6,494,321 B1 * | 12/2002 | Sadow et al. | | 206/320 |
| 6,515,223 B2 * | 2/2003 | Tashjian | | 174/388 |
| 6,763,942 B1 * | 7/2004 | Yeh | | 206/320 |
| 7,036,642 B2 * | 5/2006 | Hoberman et al. | | 206/320 |
| 7,772,504 B1 * | 8/2010 | Tashjian | | 206/320 |
| 2002/0175099 A1* | 11/2002 | Wu | | 206/320 |
| 2004/0134812 A1* | 7/2004 | Yeh | | 206/320 |
| 2004/0188289 A1* | 9/2004 | Woo | | 206/320 |
| 2006/0113203 A1* | 6/2006 | Daley | | 206/320 |
| 2009/0078707 A1* | 3/2009 | Chen | | 206/320 |
| 2011/0272305 A1* | 11/2011 | Lee | | 206/320 |

* cited by examiner

*Primary Examiner* — Byron Gehman
(74) *Attorney, Agent, or Firm* — Richard A. Joel, Esq.

(57) ABSTRACT

A unique laptop computer or similar device carrying case, which can also shield an individual from electromagnetic radiation (EMF) including RF microwave radiation and also heat transfer from the laptop computers when opened or in the closed positions. A conductive fabric is positioned against non-conductive plastic sheeting and is rolled up on itself, on four sides, to provide a larger effective virtual shield in the two side insulating sections, each of which includes an inner luan material with optional magnetic shielding or a perforated metal shield and a solid metal shield in the base to protect against electromagnetic radiation. The shield can be incorporated in existing cell phone/PC cases or flip top cell phone cases. Further, a pocket shield can be used to store cell phones in apparel pockets.

22 Claims, 14 Drawing Sheets

FIG 13a

LAPTOP SHIELD CARRYING CASE AND CELLULAR SHIELD HOLSTER

CROSS REFERENCE TO RELATED APPLICATIONS

This application is a continuation-in-part of Ser. No. 12/211,589 filed Sep. 16, 2008 now U.S. Pat. No. 7,772,504.

STATEMENT REGARDING FEDERALLY SPONSORED RESEARCH OR DEVELOPMENT

Not Applicable

PARTIES TO A JOINT RESEARCH AGREEMENT

Not Applicable

DESCRIPTION

1. Background of the Invention

This novel invention relates to laptop computers also known as notebook computers and cellular phones and particularly to a shielding assembly (TCS™) which substantially eliminates the dangers of electromagnetic radiation including but not limited to RF microwave and heat transference emitted from laptop computers and cellular phones. The shielding assembly also serves as a carrying case for the laptop and provided the advantage of easy access to the, TCS Holster™ for cell phones and optional detachable and/or fixed pouch over it, items like a pen and pad organizer via a vertical Velcro accessory strip and fixed pouch for storing an external mouse and/or power cord, extending midway on its outer side region. The invention also discloses a flip version of the cellular shield case/holster and a cellular shield pocket for carrying cell phones on ones' person.

This invention addresses the concerns over possible health hazards caused by the emission of EMF including but not limited to RF microwave radiation and heat emitted from laptop computers and also the need for mobile accessories for use with laptops. The invention protects the user from such various types of radiation by using particular shielding technologies such as disclosed in U.S. Pat. Nos. 6,515,223 and 5,367,309 to Richard Tashjian. In the present invention, the shielding technology is contained within the carrying case 'the Cave™' for laptops and an associated storage case for cell phones whether carried with a clip or belt loop attached to the case or a neck tube.

2. Description of Related Art Including Information Disclosed Under 37 CFR 1.97 & 1.98

The prior art discloses a wide variety of carrying cases for laptop computers, however, these existing designs are overly complicated and focus heavily on proposing varying dimensions in laptops, notebook computers, and laptop accessories as well. The present invention focuses on shielding the user from harmful EMF including but not limited to RF microwave radiation and heat, while serving at the same time as a simple, lightweight/compact, protective, attractive, and sturdy case in which the user can carry a laptop. The invention also makes cellular phones more readily and safely available by being able to store the phone on the case with a Velcro® accessory strip when placed in a Cellular Shield or Cellular Shield Holster via the accessory Velcro® strip.

Prior art patents of interest in addition to applicant's previously cited U.S. Pat. Nos. 6,515,223 and 5,367,307 include U.S. Pat. Nos. 7,036,642; 6,349,825; and, 5,124,899.

SUMMARY OF INVENTION

The present invention shields the laptop user from the harmful heat and the EMF generated including but not limited to RF microwave radiation emitted by a laptop particularly when being used on the user's chest or lap regions and also serves as a lightweight carrying case and base support for the laptop computer. The shielding device folds over itself to form the carrying case and protects the laptop or notebook when stored therein. The case has open sides and a top to facilitate use. With the open top and partially open side regions, cooling is facilitated after the apparatus is turned off or if it is mistakenly turned on.

The product of this invention includes a substantially rectangular main body portion having sewn insulating sections along the internal nylon face thereof and an external sewn face made of leather or similar materials. The main body portion is manufactured using the shielding technology disclosed in U.S. Pat. Nos. 6,515,223 and 5,367,309 to Tashjian. Essentially, the body is rectangular in shape and comprised of conductive fabric centrally positioned against a non-conductive plastic, then rolled up onto itself for several inches inwardly on all four sides. This permits a larger functional effective virtual shielding area while having a physically smaller acting/functioning area. This process allows for a minimum of three to five times the functional surface area ratio, (as was also previously stated in applicant's patent '223) increasing the actual shielding effectiveness many fold while physically displaying a smaller more compact working area. The EMF "sees" the shielding area as a larger effective area then it actually is. This shielding structure can be used in laptop cases, cell phone cases, or pockets for carrying cell phones.

An optional magnetic field shielding layer may be used in the laptop carrying case instead of the perforated metal sheeting layer. This shielding layer comprises thin plywood laminate sheeting wrapped in a magnetic field shielding material which provides a durable lighter structure. The shielding layer would be mounted internally on each side of the case.

On all size cases, handles are mounted on both ends of the main body of the case to fold over against one another or be used as a single handle. Velcro® tabs and strips are mounted on the external main body sides. The main body is flexible in two linear regions allowing three mobile sections only due to the rigidity of the three Luan or similar material sheets ~¼" in thickness sections mounted within the casing. The body folds over itself to form a carrying case with a base and two sides. The case is secured by fastening Velcro®/leather elastic straps having mounted Velcro® tabs to the Velcro® tabs on the upper and side portions of main body. The TCS Holster case may be readily mounted on the external face of the carrying case via a midline vertical accessory Velcro® strip for purposes of carrying a cellular phone in the holster or for storing a Cellular Shield (U.S. Pat. No. 6,515,223), as well as, optional detachable accessories like a pen/pad organizer, et al. External risers may also be provided on the external face as well as internal risers on which to place the laptop when the case is opened. Optionally, a pivotal mouse pad may be mounted to one of the internal faces to swing outwardly therefrom for use.

The present invention protects the user from the thermal emissions and EMF including but not limited to RF microwave radiation emitted from a laptop (i.e. WI-FI, wireless, LAN/internet, etc.) when using the apparatus on your lap or chest regions. The user simply disengages the two top and two side-fastening straps on the carrying case and then opens the carrying case, which now becomes a firm/rigid shielding mat/base on which the laptop rests. The four straps can stay attached to the mat on the one side for easier access and reattachment when needed again for reattachment. The shielding mat is also used as a buffer and thermal shield between the user and the laptop. In one preferred embodiment, ¼" Luan, plywood, or similar material is formed in three sections with an optional magnetic shielding material bonded onto or around it, within the insulation to provide a magnetic shielding component in both the open and closed positions.

In addition, due to its unique design, the present invention allows for better and more efficient cooling once the laptop is shutdown or is in a standby mode or even accidentally turned on and placed in the case. This feature can add months or possibly years to the lifespan of a computer and also improves battery performance. Overheating and slower cooling can accelerate the overall aging process of the internal electrical components of the computer. This process is cumulative particularly if the laptop is accidentally turned on after being stored in the case. One can still easily see and hear it turned on while it is stored and protected in the case.

The present invention is available in several predetermined sizes to support larger or smaller laptops. There are generally about four conventional laptop sizes, all of which can be accommodated Accordingly, an object of this invention is to provide a new and improved laptop shield carrying case and an associated cellular shield holster for cell phone storage.

Another object of this invention is to provide a uniquely constructed laptop shield that folds into a compact and protective carrying case.

Another object of this invention is to provide a new and improved laptop shield including a plywood laminate wrapped in a optional magnetic field shielding material and positioned in a unique laptop carrying case.

A further object of this invention is to provide a new and improved laptop shield carrying case which includes a main body of conductive material centrally positioned against a non-conductive plastic rolled upon on itself on all four sides to provide a larger than actual virtual shield.

A still further object of this invention is to provide a flip version cellular shield case and alternatively a cellular pocket shield.

A more specific object of this invention is to provide a new and improved laptop shielding carrying case for protecting against heat and EMF radiation wherein the main body includes three Luan or similar material sheeting sections with magnetic shielding material bonded or around it to shield the laptop magnetically and a virtual electro-shield of conductive material and further including Velcro® affixed portions on the external faces for securing the sides into a carrying case and for mounting a cellular shield holster. Also inside the casing is a micro-bubble type plastic foam sheathing or similar material for the thermal shielding component, as well as, protection against shock/external vibrations and a Faraday cage compartment to store credit cards, ATM cards, etc.

BRIEF DESCRIPTION OF DRAWINGS

The above and other objects and advantages of the present invention may be more clearly seen when viewed in conjunction with the accompanying drawings wherein:

FIG. 1a is a perspective front view of the laptop shield carrying case while

FIG. 9a shows a flip version of the cellular shield case/holster in an open position whereas

DETAILED DESCRIPTION OF THE INVENTION

The invention relates to laptop computers 8 and particularly to a shielding carrying case assembly 9 that substantially eliminates the dangers of EMFs including but not limited to RF microwave radiation and heat emitted from the laptop 8. The shielding assembly 9 folds into a carrying case type configuration for the laptop 8 and is also able to support The Cellular Shield (TCS) and The Cellular Shield (TCS) Holster 50 by means of a Velcro® accessory strip 53 mounted vertically on the exterior midline of the case. Additional optional accessories can also attach/detach to this Velcro strip (i.e. a pen and pad organizer). It can also have a fixed pouch over it for additionally storing an external mouse and/or power cord.

Figure 1A:
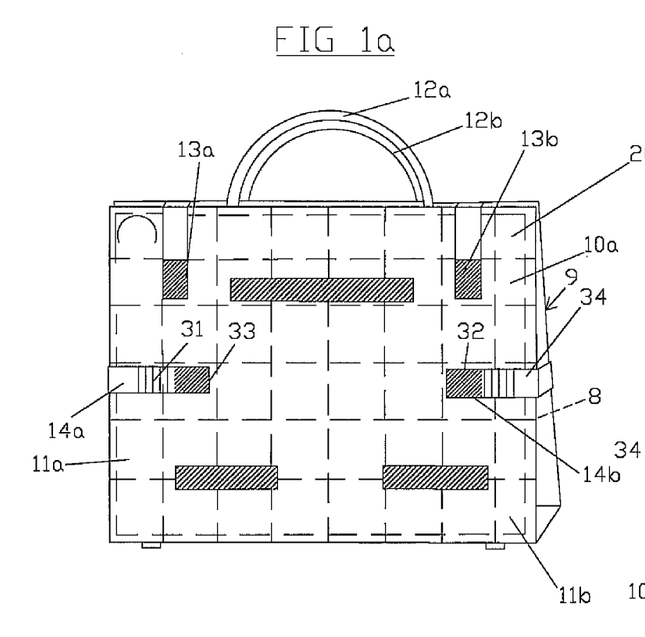
Figure 1B:
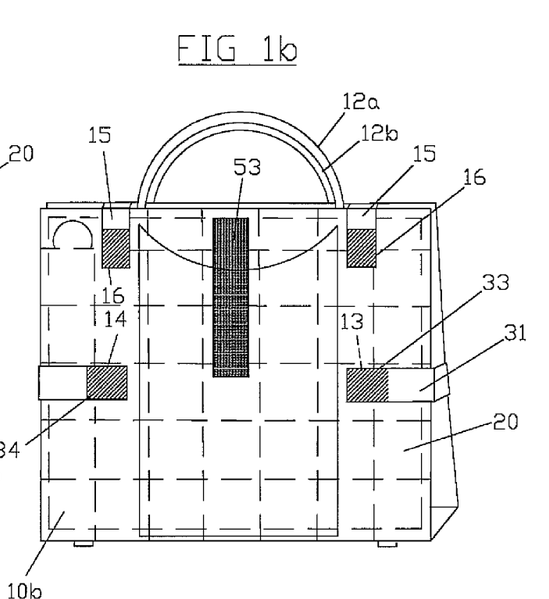
FIG. 1b is a perspective rear view of the laptop shield carrying case.

Referring now to the drawings, FIGS. 1a, 1b disclose respectively a front and a rear view of the carrying case 9 of the present invention. The invention includes a main body 10 having an external face 11a made of a leather or equivalent material preferably in a plurality of sewn sections 20. A handle 12a, 12b is mounted to the top edge of the main body 10 and to the other edge as well on larger sizes. Two substantially rectangular hook and loop pads 13a, 13b are mounted vertically near the top of the external face 11a. Two substantially rectangular hook and loop pads 14a and 14b are mounted horizontally near the opposite mid-points of the external face 11a. FIGS. 1a and 1b also disclose a plurality of substantially rectangular straps 15 with mating fastening elements 16 that can attach to the hook, loop pads 13a, 13b and 14a, 14b, and contain the laptop 8 within the case 9. Side straps 31 and 32 include fasteners 33 and 34 which engage pads 13 and 14 to secure the sides of the case 8.

Figure 2:
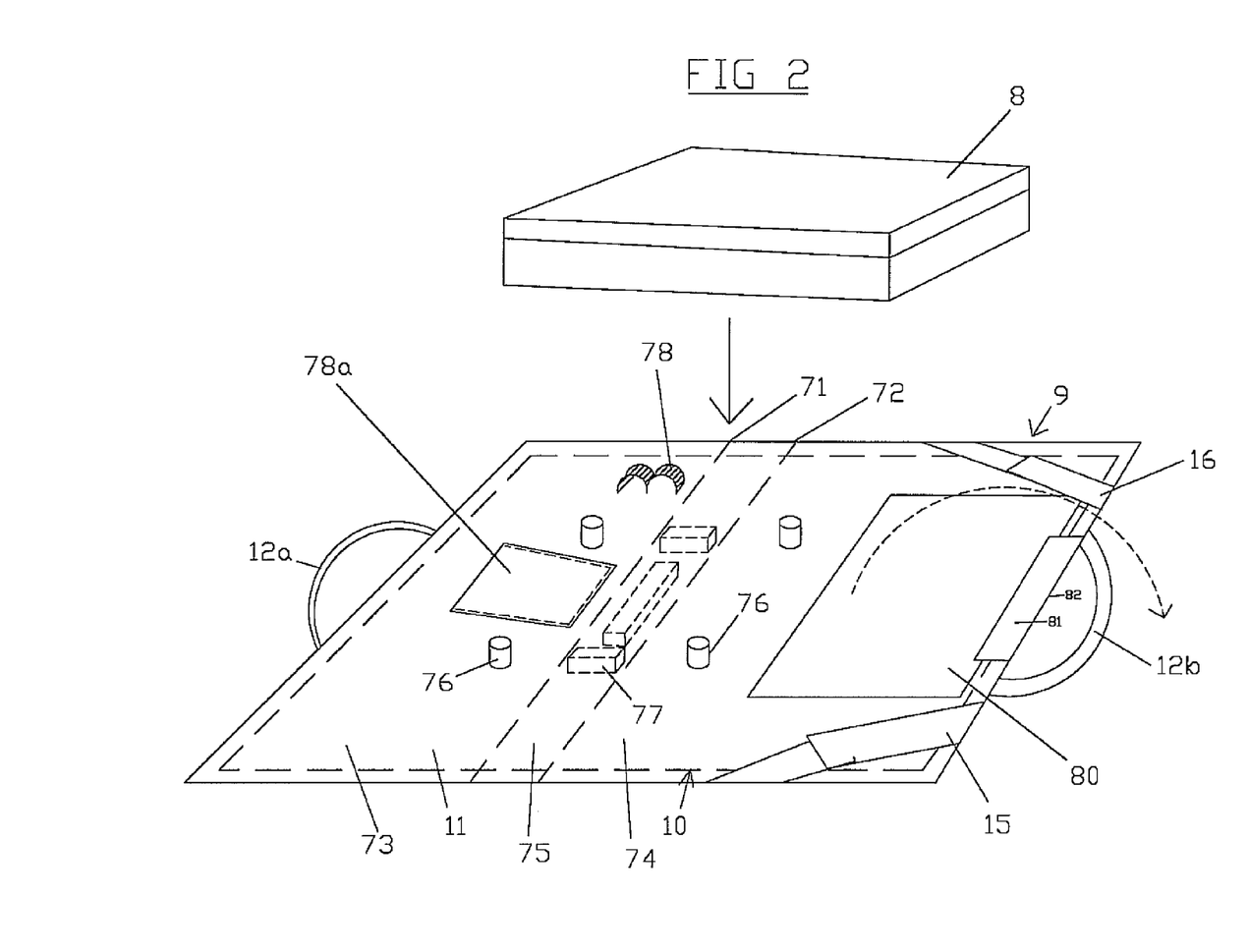
FIG. 2 is a perspective view of the new and improved laptop case in an open position with the computer.

FIG. 2 discloses the internal face 11b of the case 9 in a fully open position for shielding a laptop computer 8 ready for loading in the case 9. The main body 10 is folded along the lines 71, 72 to form the two sides 73 and 74 and the base 75 to hold the computer 8. The internal risers 76 are mounted on the internal faces 73, 74. The cylindrical or rectangular risers 76 are intended to space the laptop 8 from the faces 73, 74 for cooling purposes. Optionally, risers 77 may be affixed or removably mounted to the base 75. A mouse-pad 80 may be pivotally mounted with element 81 to the edge 82 so that it can pivot outwardly for use. The side holding straps 15 attach and fold as indicated when the case 9 is in an open flat position. Elastic holders 78 may be provided for holding pens, magnetic risers etc. A storage box 79 may be included on the base 75 to store external risers.

Figure 3:
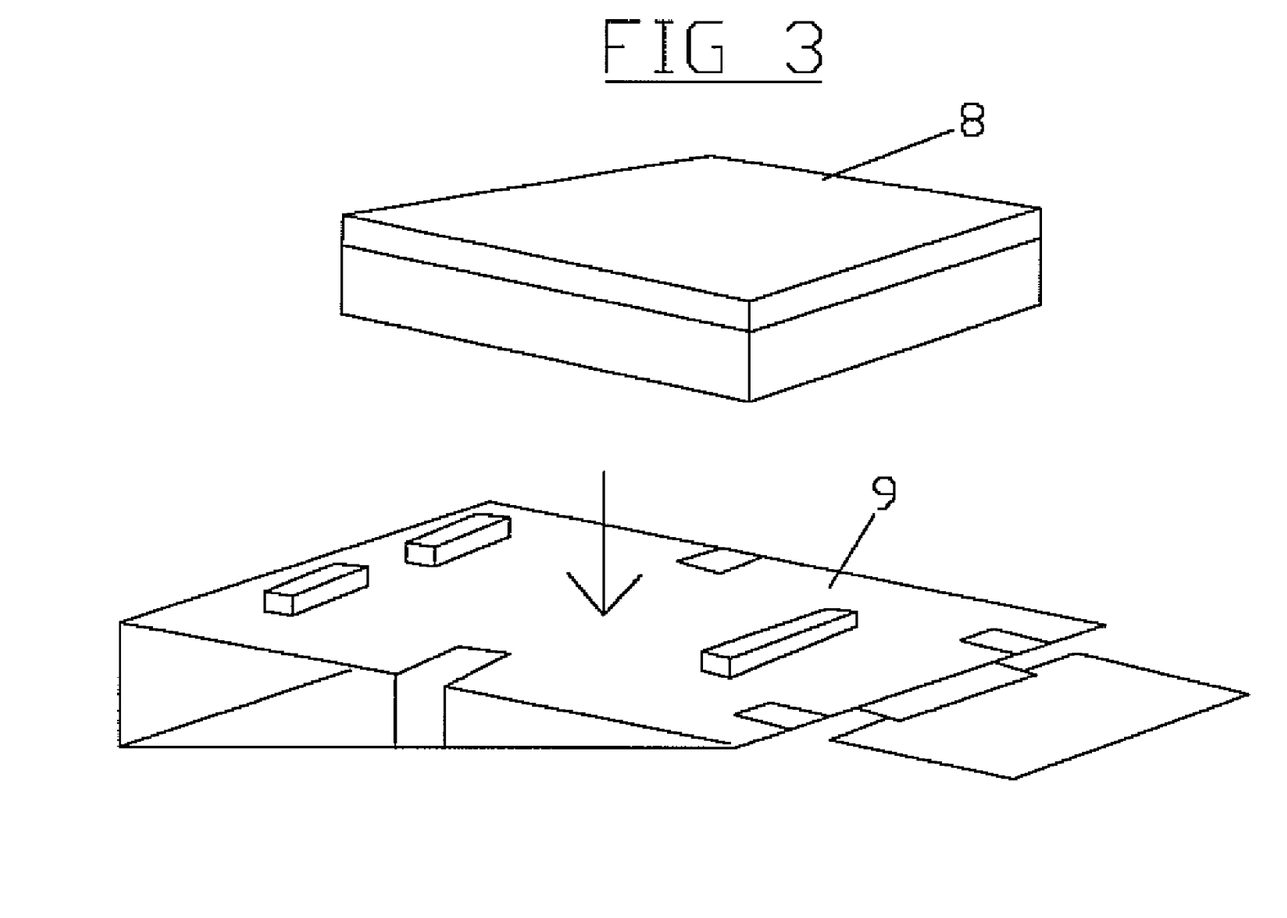
FIG. 3 is a perspective view of a computer and the laptop shield in a closed inclined position with risers.

FIG. 3 discloses a laptop computer 8 which is positioned on risers 76 on the case 9. The mouse pad 80 pivots outwardly from the case 9 to facilitate use with the computer 8. The case 9 is positioned on the incline for ease of viewing.

Figure 4A:
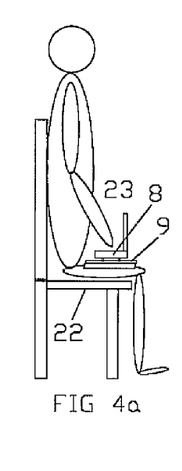
FIGS. 4a-4f are schematics showing the use of the laptop shield/case in various positions.
Figure 4B:
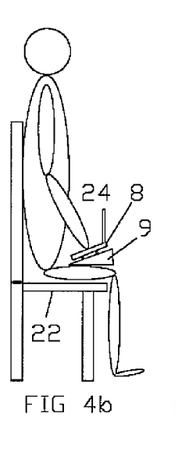

FIGS. 4a, 4b schematically depict the use of the laptop shield 9 in respective opened flat 23 and closed inclined positions 24 with the user 21 sitting on a chair 22. The laptop 8 is flat with respect to the carrying case 9 in FIG. 4a and at an angle in FIG. 4b with the closed case 9. The base 35 provides the incline which facilitates the user's view of the keyboard and computer 8.

Figures 4C, 4D, 4E, 4F:
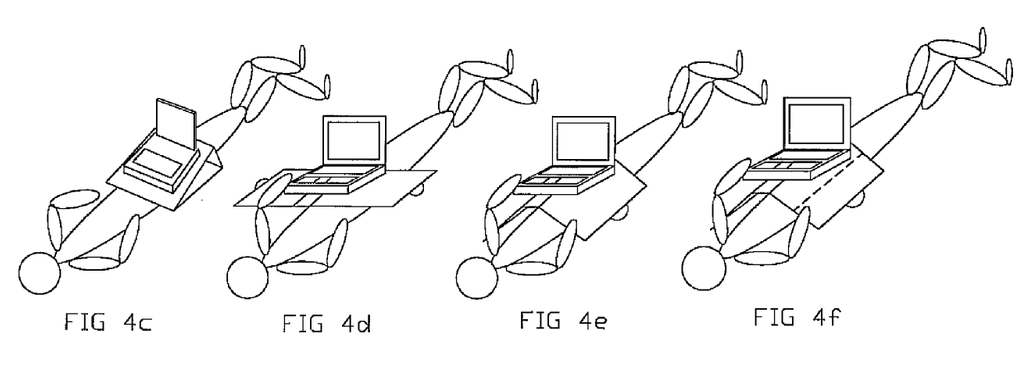

FIGS. 4c-4f show the use of the laptop shield 9 in a supine position. FIG. 4c shows the case 9 in a closed position while FIG. 4d shows the case 9 in an open flat position. FIGS. 4e and 4f show the main body 10a, 10b of the case in a folded position. Folding the case 9 about the user as in FIGS. 4e and 4f minimizes any remaining magnetic field energy component by channeling whatever is not reduced around the user's body.

Figure 5:
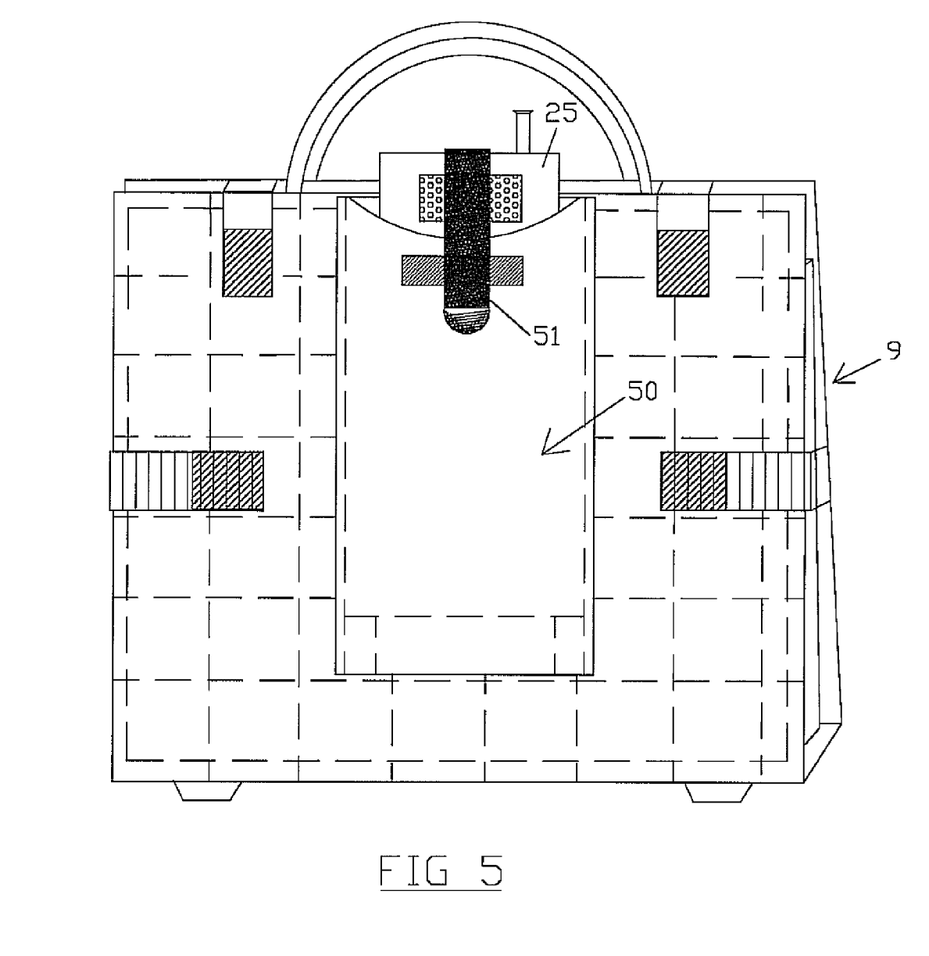
FIG. 5 is a perspective view showing the laptop/shield/case with a TCS holster attached thereto.

FIG. 5 is a perspective view showing the laptop shield carrying case 9 with a TCS holster 50 having a cell phone 25 mounted therein. The holster 50 is secured to the main body of the case 9 by the Velcro® accessory strip 53. The Velcro® strap 51 secures the cell phone 25 within the holster 50.

Figures 6A, 6B:
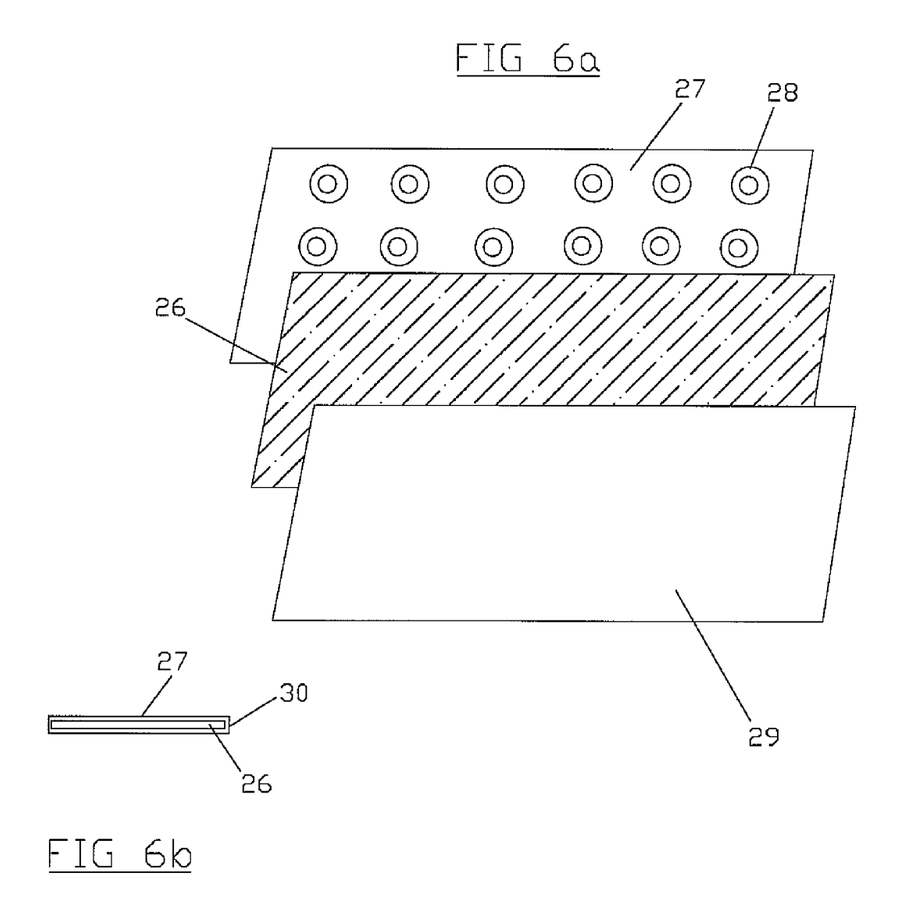
FIG. 6 is an exploded perspective view of the magnetic field shielding layer of the cellular shield case/holster.

FIG. 6 is a perspective view of the laptop shield/case layered components. A thin plywood laminate (luan) sheeting 26 or a hollowed out sheet of plastic paneling or similar material (not shown) engages spacers 28 on a thin magnetic field shielding sheeting 27. A secondary thin magnetic field shielding material 29 is wrapped about the plywood 26 forming a box shaped configuration 30 as shown in FIG. 6b.

Figure 7A:
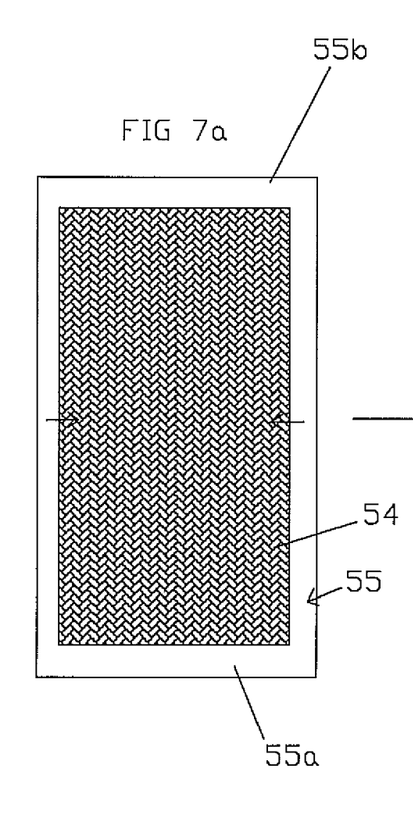
FIGS. 7a-7c are drawings depicting the forming of the EMF metal shielding layer.
Figure 7B:
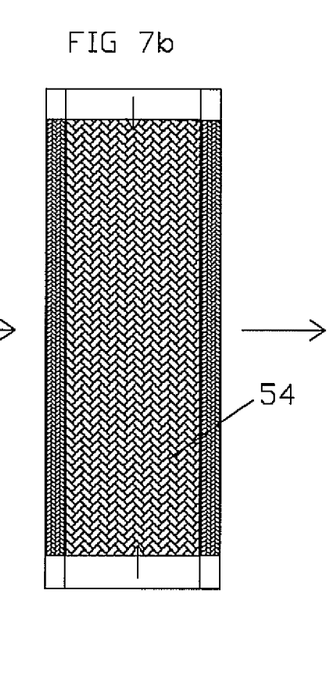
Figure 7C:
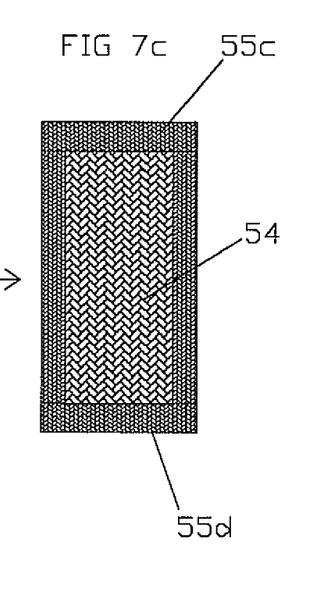

FIGS. 7a-7c shows the assembly of electro-component shielding aka TCS for the laptop case 9 wherein vertical shielding is employed. FIG. 7a shows conductive fabric 54 mounted with plastic sheeting 55. In FIG. 4b the horizontal edges 55a-55b folded inwardly shrinking the shield size. In FIG. 7c, the edges 55c and 55d are folded downwardly shrinking the shield to the size of a cell phone 25. The approximate EMR mitigating effect causes 50-60% deflection/reflection via a type of "parabolic effect". The remaining 40-50% is absorbed or cancelled out via a "self-ground" phenomenon.

Figure 8:
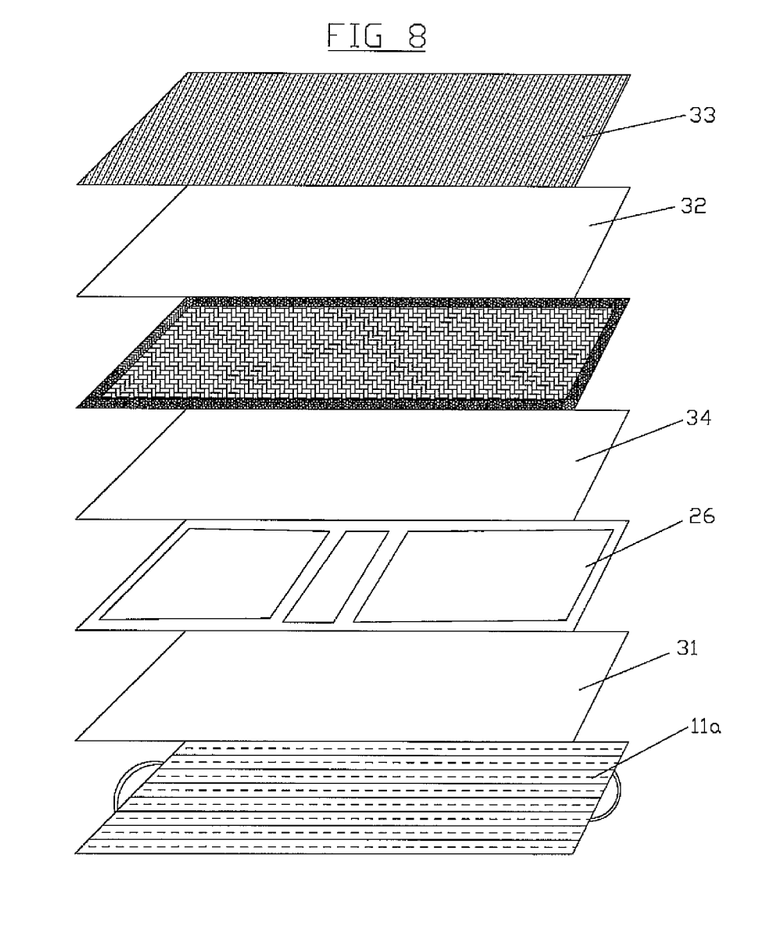
FIG. 8 shows schematically the assembly of the layered components forming the laptop carrying case.

FIG. 8 shows the assembly of the laptop shield with case-layered components. The outside face 11a of leather or nylon has a flexible ~⅛" plastic type Styrofoam sheet (or similar material) 31 mounted thereto and then an optional luan shielding sheet 26 in three sections, and a flexible ~⅛" plastic type Styrofoam sheet 34. A metal electric shielding sheet 35 is mounted to the luan sheet 26 and then a further plastic Styrofoam 32 sheet is mounted thereto. The inside surface comprises a sports/ballistic nylon sheet 33 (or similar materials). This layered assembly forms the laptop shield carrying case 9.

The above shielding assembly, once completely rolled up/formed, may also be used by wrapping or bending the two sides and bottom rolled edges around at 90° and fitted inside TCS Holster casing along the inside of its both sides and bottom regions. This additional step would allow for an even smaller, more compact, AP (Antero-Posterior) portrait/view while still maintaining its overall shielding effectiveness/performance.

Figure 9A:
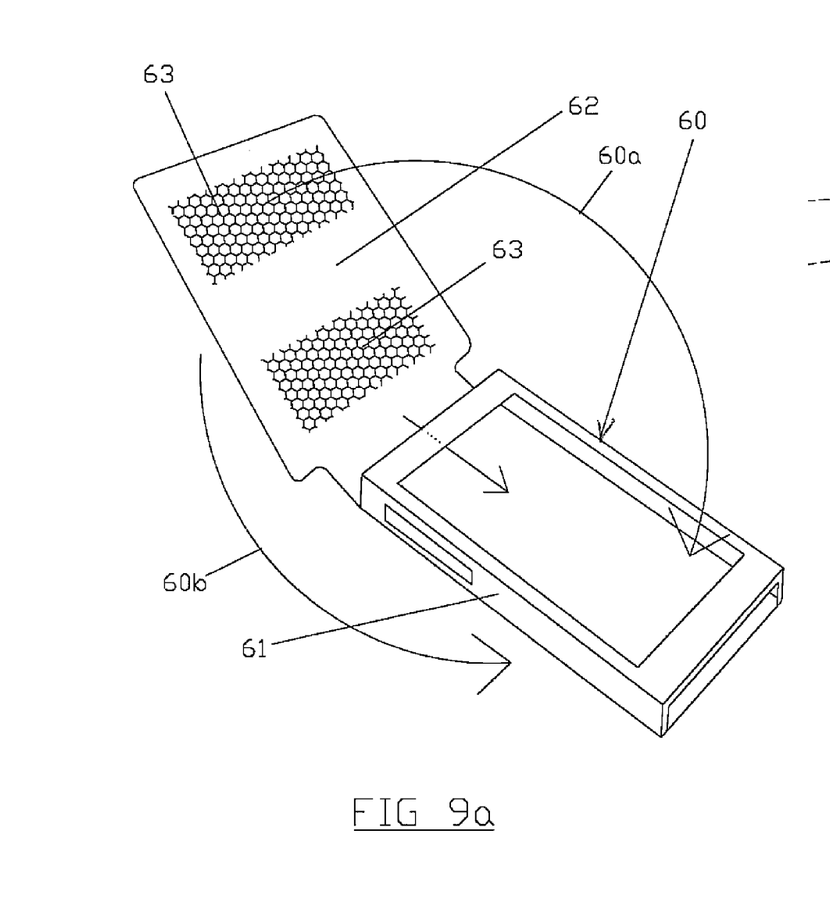

FIG. 9a is a flip version of the cellular shield case/holster 60 in an open position. The cell phone (not shown) slides into the case 60 in the direction of the arrow where it is retained therein. The shielding is contained in the flipping section 62. This section pivots over the case 60 to enclose a cell phone. The side of this case is indicated as 61. Holes 63 in the covering material permit improved audio transmission. 60a direction is in the talking position (closed position) and 60b direction is in the storage position (opened position). The shielding is as previously discussed.

Figure 9B:
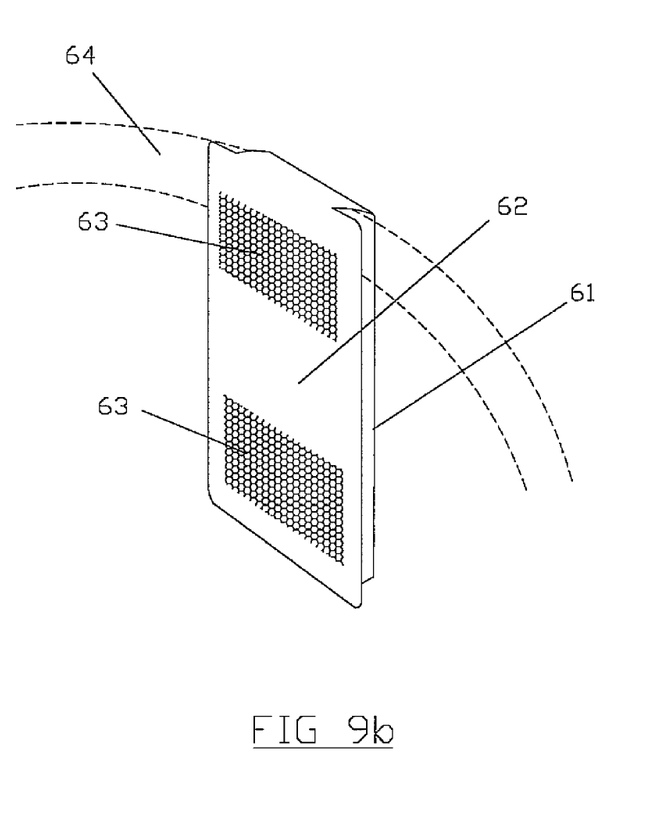
FIG. 9b shows it in a closed position.

FIG. 9b shows the shield/holster 60 in a completely folded backward and down stored position over a belt 64 protecting the user's body.

Figure 10:
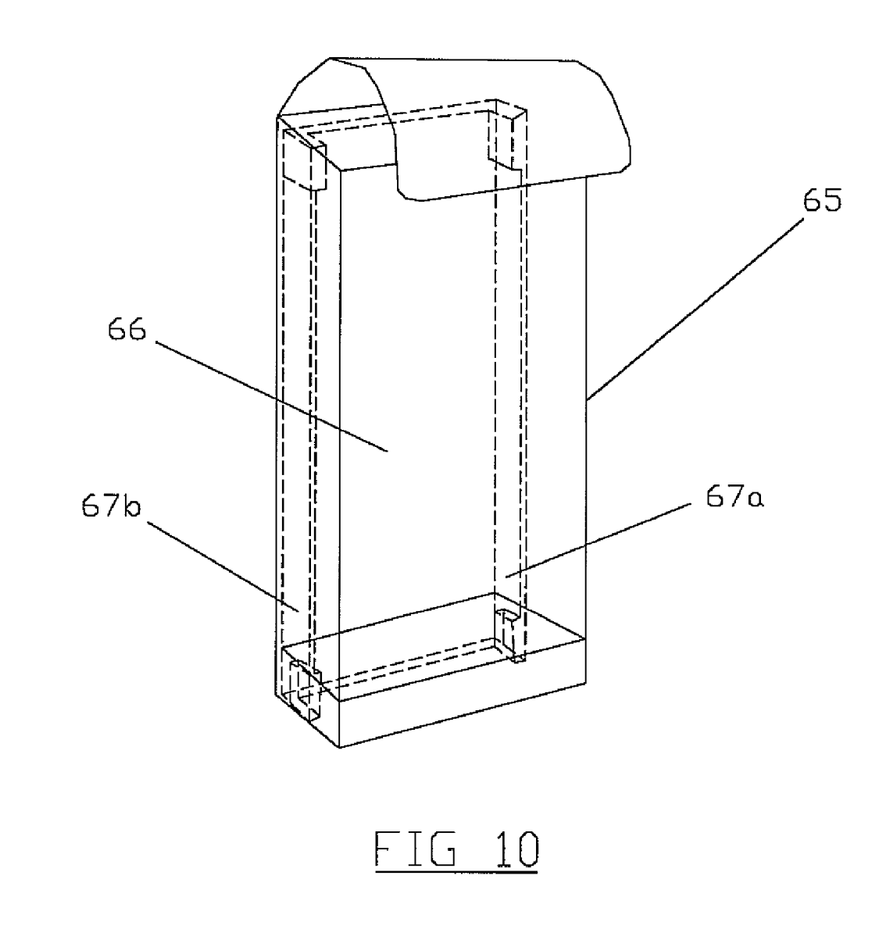
FIG. 10 shows a box version of the cellular shield case wherein end portions are bent at right angles and the shield is positioned in the case.

FIG. 10 discloses a box version 65 of the cellular shield case wherein end portions 67a, 67b, of the shield 66 are bent at right angles and the shield 66 is positioned in the case 65.

Figure 11:
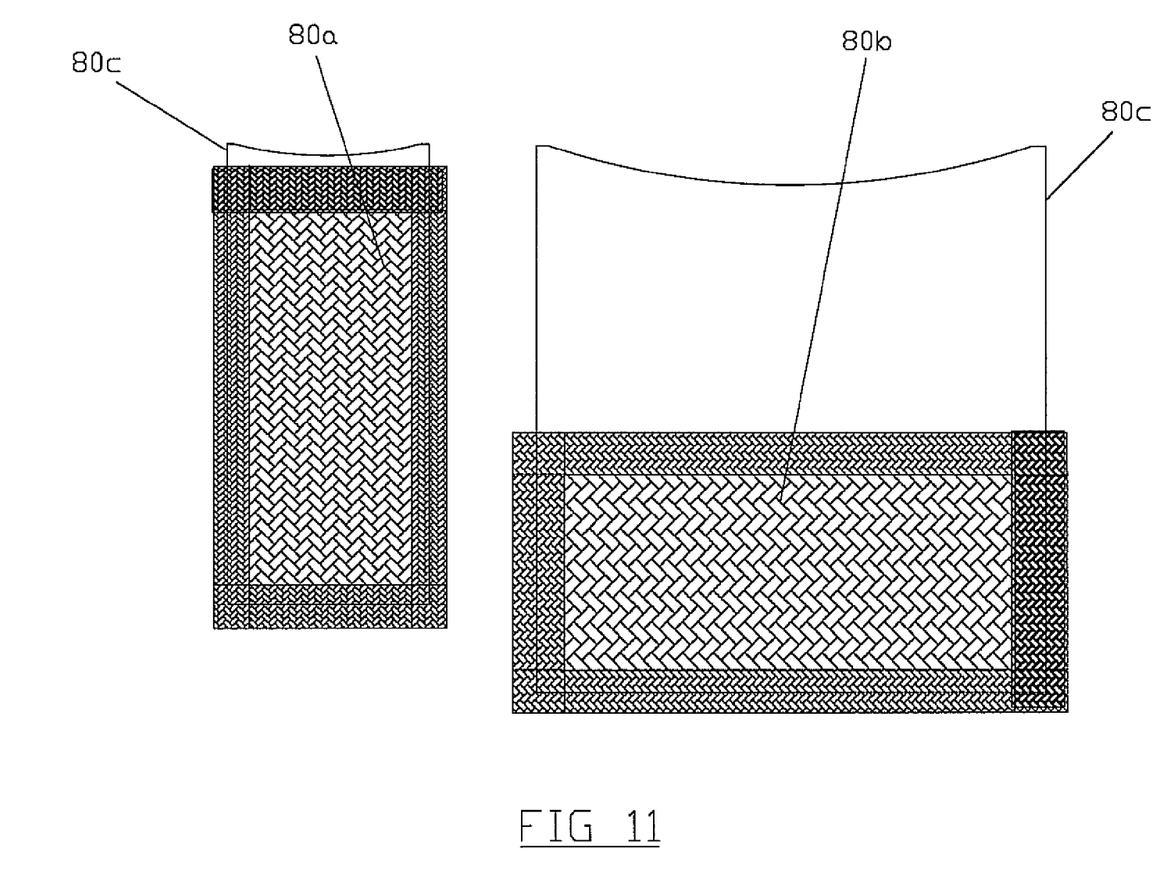
FIG. 11 shows the cellular shield 80 which can be placed in an apparel pocket to provide cell phone shielding.

FIG. 11 shows the cellular shield pocket 80a and 80b which is placed in an apparel pocket 80c to provide cell phone shielding. The arrangement provides shielding when a cell phone is placed in a pocket for storage and/or when used with a head set. One simply drops the cell phone into a shield pocket opening 81 to protect the user's body. The shield 80 can also be dropped in existing cell phone cases.

Figure 12:
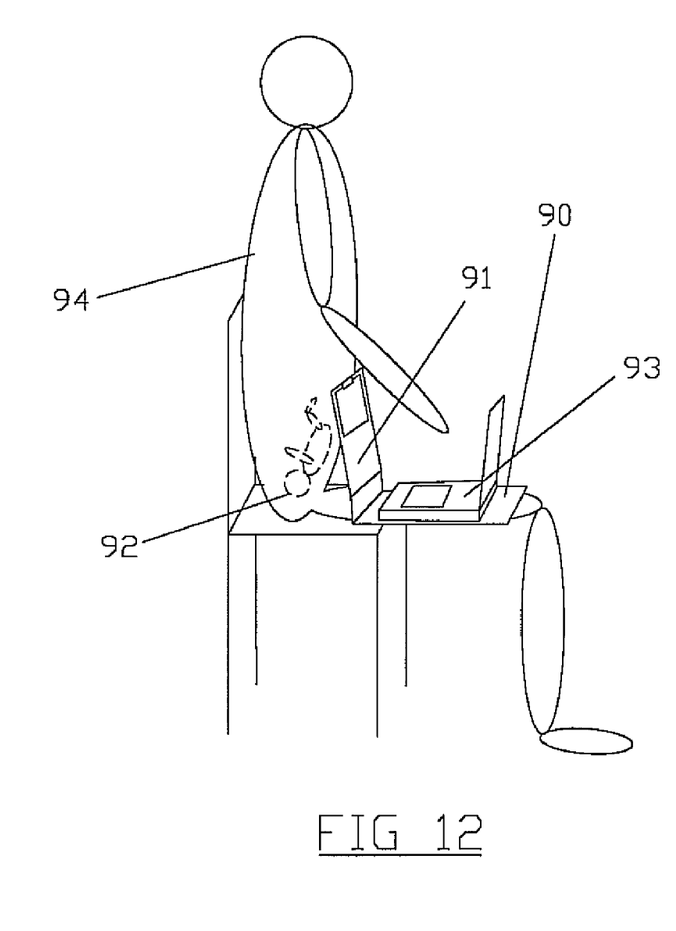
FIG. 12 shows the laptop shield case in the open position with a flip side which protects a fetus in utero from radiation.

FIG. 12 shows the operation of the laptop shield case 90 in the open position with a flip side 91 which protects a fetus in utero 92 from radiation emitted by the laptop 93 during operation by an individual 94.

It is to be noted in the above description that a Faraday Cage Compartment FIG. 2 78a, in the CAVE™ case can be safely used for storage of credit cards, ATM cards, etc. This can reduce electronic stealing of the personal information stored on the cards via the new remote blink technology that is currently being deployed in today's market.

A further advantage of the CAVE™ Laptop Case/Shield is that the conductive material alone can be used without any folding with the non-conductive material to still maintain a substantial EM shielding barrier due to the unique design of the case. The case design incorporates the additional EM mitigating elements of distance, redundancy, and increased surface working area.

Figure 13A:
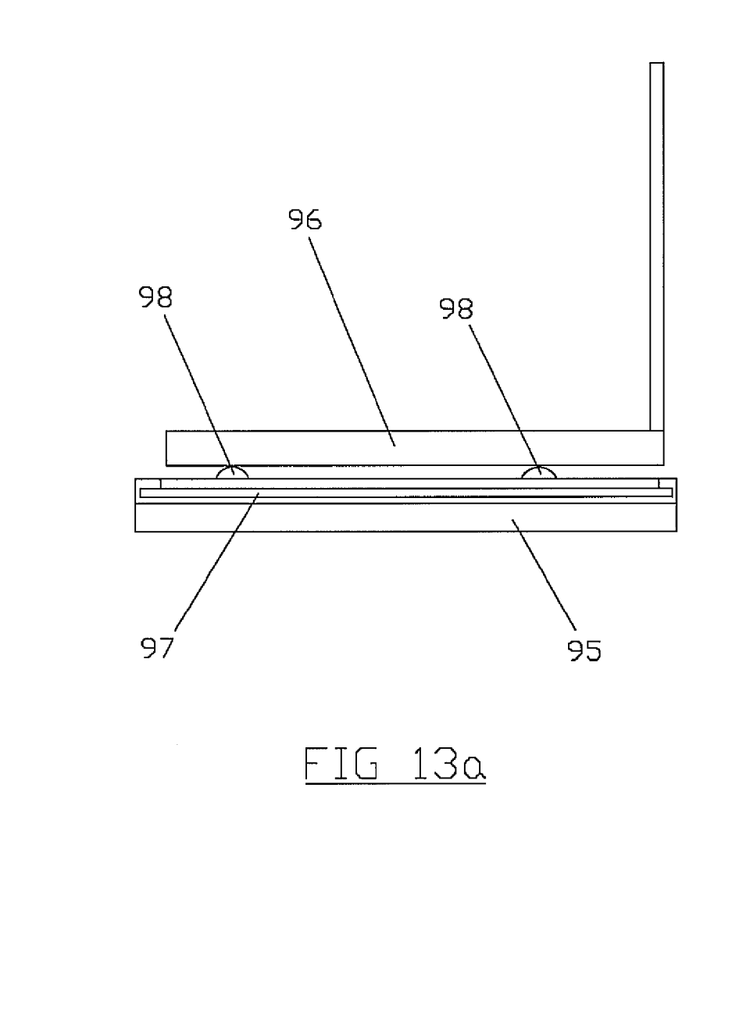
FIGS. 13a and 13b are side views of the shielding apparatus showing the use of risers; and, FIGS. 14a-c shows the implementation of the shielding apparatus in existing cellular phone and laptop computer cases.
Figure 13B:
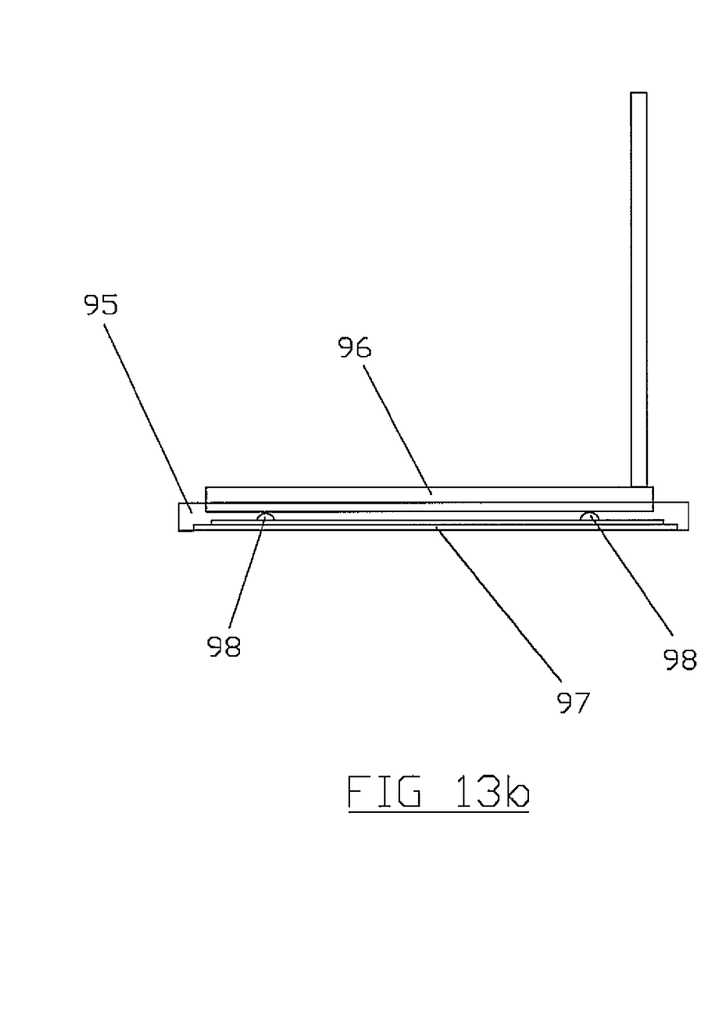
Figures 14, 14A, 14B, 14C:
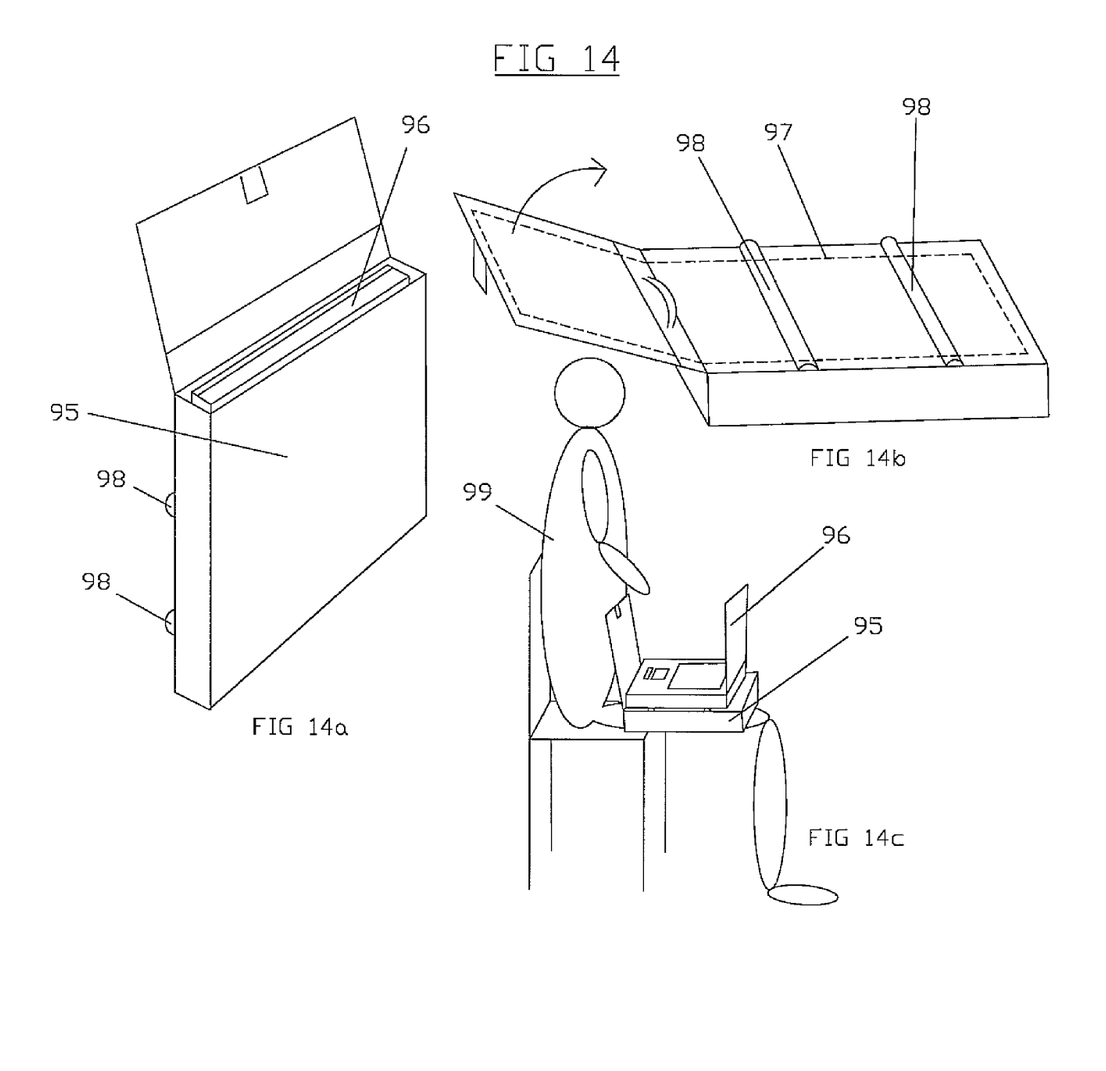

The above aforementioned Shielding Apparatus 97 (a.k.a. The Cellular Shield™, a.k.a. TCS™) can also be implemented inside already existing cellular phone and laptop computer cases and sleeves by simply varying its overall size and/or shape, protecting the user 99 see. FIGS. 13 a and b and 14a-c. Here, Risers 98 are also implemented, raising the laptop computer 96 slightly, as to not obstruct intake airflow needed for its cooling system when it is placed on top on case/sleeve 95.

While the invention has been explained by a detailed description of certain specific embodiments, it is understood that various modifications and substitutions can be made in any of them within the scope of appended claims, which are intended also to include equivalents of such embodiments.

What is claimed is:

1. A laptop shield carrying case and cellular shield holster comprising:
   a substantially rectangular base having four sides;
   a first and a second rectangular side member each having an internal and external face and each member being pivotally connected at one end to opposite sides of the base wherein the side members are foldable along the base into engagement at the opposite end of said side members to form said carrying case;

shielding means mounted to the internal face of each side member;

hook and loop fastening means mounted to the external face on one side member and mating straps mounted to the external face on the other side member to permit closing the carrying case, the hook and loop fastening means further including a strip on said side member;

a cellular shield holster having a hook and loop fastener to mount said holster to the case; and, the first and second side members each having a handle mounted thereto at the end opposite the base.

2. A laptop shield carrying case and cellular shield holster in accordance with claim 1 wherein:

the internal face on each side member include a plurality of risers mounted thereto to space a laptop from the face of a side member.

3. A laptop shield carrying case and cellular shield holster in accordance with claim 1 wherein:

the base includes a plurality of risers mounted to the base.

4. A laptop shield carrying case and cellular shield holster in accordance with claim 1 further including:

a mouse pad pivotally mounted to the internal face at one end of one side.

5. A laptop shield carrying case and cellular shield holster in accordance with claim 1 further including:

a plurality of risers removably mounted to an external face on one of the sides.

6. A laptop shield carrying case and cellular shield holster in accordance with claim 1 further including:

a shielding layer comprising a thin plywood laminate and a magnetic field shielding material wrapped around the plywood laminate said layer being mounted within each face.

7. A laptop shield carrying case and cellular shield holster comprising:

a base and a first and second side member mounted thereto on opposite portions of the base and having inner and outer faces on said side members connected to said base and extending upwardly therefrom to form a laptop case;

a first and second shield comprising a four sided rectangular conductive fabric and a non-conductive plastic casing positioned against said fabric and rolled upon on itself inwardly on all four sides to provide a larger effective electric shield in a compact space, said first and second shield being attached to the first and second faces respectively;

a thin plywood laminate, bonded onto a magnetic shielding material adjacent the fabric shield for magnetic shielding;

an outer leather layer located on the outer face of the first and second sides and the base;

a thin micro-bubble plastic foam sheathing material for thermal absorption and to absorb external vibrations mounted internally to said faces;

hook and loop fasteners mounted to the outer leather layer to join the first and second side members to form an envelope for a laptop; and, a strap mounted to at least one side of the case to provide a carrying handle.

8. A laptop shield carrying case and cellular shield holster in accordance with claim 7 wherein:

the outer leather layer and the inner foam layer each comprise a plurality of rectangles sewn together.

9. A laptop shield carrying case and cellular shield holster in accordance with claim 8 further including:

a hook and loop strap on the outer leather layer; and, a cellular shield holster mounted to the outer layer with a mating hook and loop strap.

10. A laptop shield carrying case and cellular shield holster in accordance with claim 9 wherein:

the cell phone holster comprises a shaped fabric and non-conductive plastic rolled over on itself and sewn together to form a receptacle for a cell phone providing a larger effective shielding area.

11. A laptop shield carrying case and cellular shield holster in accordance with claim 7 further including:

a neck tube comprising a hollow cylinder which does not twist, mounted to the holster to optionally permit carrying the holster around one's neck.

12. A laptop shield carrying case and cellular shield holster in accordance with claim 7 further including:

a plurality of risers mounted to the inner face of side member to space a laptop from said inner face.

13. A laptop shield carrying case and cellular shield holster in accordance with claim 7 further including:

a mouse pad pivotally mounted at one end to an inner face and movable to the outside of the case.

14. A laptop shield carrying case and cellular shield holster in accordance with claim 7 wherein:

the magnetic shielding laminate comprises three sections of luan mounted adjacent to the two faces and the base.

15. A laptop shield carrying case and cellular shield holster comprising:

a substantially rectangular plastic sheet having interior and exterior faces, said faces being foldable transversely to form a base and opposite sides;

an outer leather layer mounted on the exterior face thereof and at least one shielding layer mounted beneath the leather layer interior surface; and wherein said exterior faces each includes an upper portion and hook and loop pads mounted adjacent said upper portion, and further including a plurality of hook and loop straps which hold the exterior and interior surfaces together to form an envelope for a computer and a handle mounted to the upper portion of at least one said faces for carrying the case.

16. A laptop shield carrying case and cellular shield holster in accordance with claim 15 wherein:

the carrying case may be positioned in a closed position wherein one side is substantially horizontal and the other side is sloped at an angle of approximately 12-15° to provide a forward incline for a computer and lessen fatigue.

17. A laptop shield carrying case and cellular shield holster in accordance with claim 15 wherein:

the at least one shielding layer comprise in order a first layer of plastic flexible styrofoam affixed to the outer leather layer, a magnetic shielding layer affixed to the first flexible styrofoam layer, a second styrofoam layer positioned against the magnetic shielding layer, an electric shielding layer positioned against the second flexible styrofoam layer, a third flexible styrofoam layer positioned against the electric shielding layer and an inner nylon layer.

18. A laptop shield carrying case and cellular shield holster in accordance with claim 17 wherein:

the styrofoam layers each comprise a ⅛ inch thick plastic styrofoam layer.

19. A laptop shield carrying case and cellular shield holster in accordance with claim 17 wherein:

the magnetic shielding layer comprises a first approximately ¼" plywood laminate, an intermediate approximately ¼" inch plywood laminate and a second sheet of ¼" plywood laminate, said laminates serving as a shielding layer within the case.

20. A laptop shield carrying case and cellular shield holster in accordance with claim 15 wherein:

a solid ¼" plywood laminate plate is located in the base of the carry case.

21. A laptop shield carrying case and cellular shield holster in accordance with claim 15 wherein:

the shielding layer comprises substantially rectangular plastic sheeting having upper and lower sides;

a conductive fabric having longitudinal and transverse sides mounted within the plastic sheeting and rolled inwardly on both longitudinal sides and affixed in position and wherein the transverse sides are rolled inwardly and affixed in position so that a larger virtual shield is provided in a physically smaller space.

22. A laptop shield carrying case and cellular shield holster in accordance with claim 12 further including:

a base portion between the inner faces and a storage box located on said base.

* * * * *